(12) United States Patent
Allen et al.

(10) Patent No.: US 8,218,263 B2
(45) Date of Patent: Jul. 10, 2012

(54) WRITE HEAD WITH DIFFERENT UPPER AND LOWER YOKE LENGTHS AND METHODS FOR MAKING THE SAME

(75) Inventors: Donald G. Allen, Morgan Hill, CA (US); Wen-Chien David Hsiao, San Jose, CA (US); Edward Hin Pong Lee, San Jose, CA (US); Jennifer Leung, Fremont, CA (US); Vladimir Nikitin, Campbell, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 723 days.

(21) Appl. No.: 12/341,908

(22) Filed: Dec. 22, 2008

(65) Prior Publication Data
US 2010/0157471 A1 Jun. 24, 2010

(51) Int. Cl.
*G11B 5/127* (2006.01)
*H01L 43/12* (2006.01)
(52) U.S. Cl. .......... 360/123.01; 360/123.03; 360/125.04
(58) Field of Classification Search .......................... None
See application file for complete search history.

(56) References Cited

U.S. PATENT DOCUMENTS

| | | | |
|---|---|---|---|
| 6,404,588 B1 * | 6/2002 | Hasegawa et al. | 360/125.51 |
| 6,483,662 B1 | 11/2002 | Thomas et al. | 360/126 |
| 6,894,877 B1 | 5/2005 | Crue, Jr. et al. | 360/313 |
| 7,238,292 B1 | 7/2007 | He et al. | 216/22 |
| 7,322,097 B2 | 1/2008 | Hsiao et al. | 29/603.24 |
| 7,343,668 B2 * | 3/2008 | Kobayashi | 29/603.16 |
| 7,764,464 B2 * | 7/2010 | Kobayashi | 360/123.06 |
| 7,791,837 B2 * | 9/2010 | Fujiwara | 360/123.41 |
| 8,018,680 B2 * | 9/2011 | Toma et al. | 360/125.19 |
| 2005/0083608 A1 * | 4/2005 | Watanabe | 360/126 |
| 2005/0141142 A1 * | 6/2005 | Mochizuki et al. | 360/319 |
| 2006/0007594 A1 * | 1/2006 | Umehara et al. | 360/126 |

* cited by examiner

*Primary Examiner* — Kevin Bernatz
(74) *Attorney, Agent, or Firm* — Zilka-Kotab, PC

(57) ABSTRACT

According to one embodiment, a system comprises an upper yoke having a first length defined between a pole tip thereof and a back gap thereof. In addition, the system includes a lower yoke having a second length defined between a pole tip thereof and a back gap thereof, the second length being greater than the first length. Also, the system includes coil turns in the upper and lower yokes. Additional systems and methods are also presented.

18 Claims, 7 Drawing Sheets

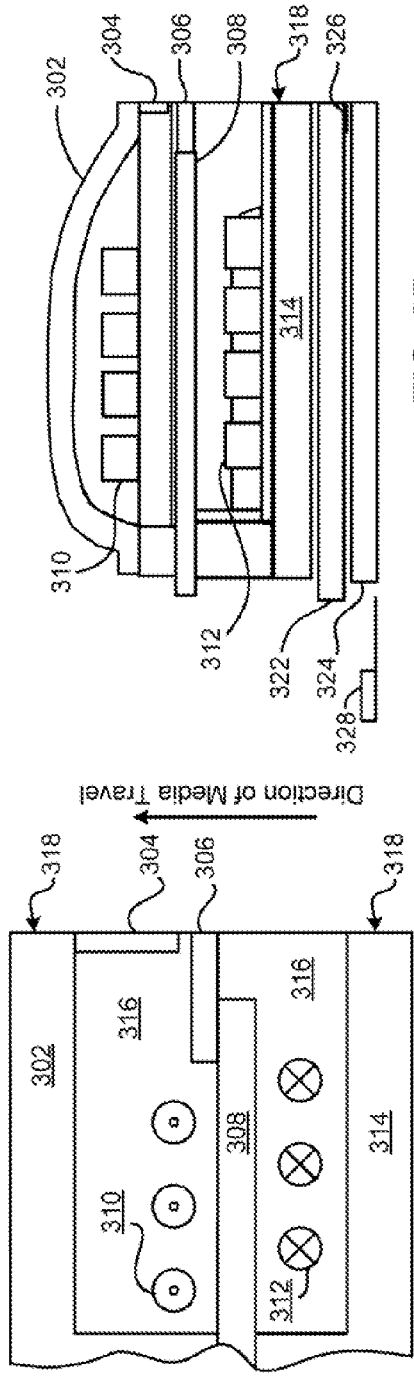
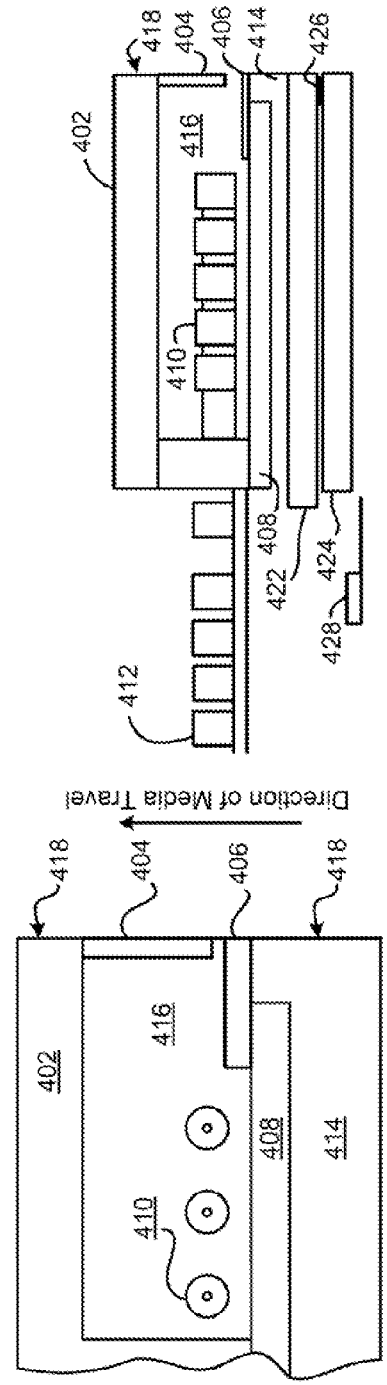

WRITE HEAD WITH DIFFERENT UPPER AND LOWER YOKE LENGTHS AND METHODS FOR MAKING THE SAME

FIELD OF THE INVENTION

The present invention relates to thin film processing and structures, and more particularly, this invention relates to magnetic write transducers and fabrication thereof.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In typical systems, recession is created after lapping and pre-carbon etching processes. This creates a distance between the transducers and the disk surface. Thermal fly-height control (TFC) is a method of altering this distance between the transducers and the disk surface by heating the components of the reader/writer causing thermal expansion of the materials, which results in the reader/writer transducers protruding closer to the surface of the hard disk. The transducers are moved closer to the disk surface to enable proper reading and writing of the tracks.

Generally, write heads are manufactured with about equal upper and lower yoke lengths. This limits the volume available for coils in the upper and lower yokes. Therefore, it would be desirable to have a magnetic head design where larger cross sectional areas can be obtained for coils in one or both of the yokes, while still preserving the small layer profiles.

SUMMARY OF THE INVENTION

According to one embodiment, a system comprises an upper yoke having a first length defined between a pole tip thereof and a back gap thereof. In addition, the system includes a lower yoke having a second length defined between a pole tip thereof and a back gap thereof, the second length being greater than the first length. Also, the system includes coil turns in the upper and lower yokes.

In accordance with another embodiment, a system comprises an upper yoke having a first length defined between a pole tip thereof and a back gap thereof. In addition, the system includes a lower yoke having a second length defined between a pole tip thereof and a back gap thereof, the second length being less than the first length. Also, the system includes coil turns in the upper and lower yokes.

According to another embodiment, a method comprises forming a lower pole of a lower yoke, the lower pole having a pole tip. Also, the method includes forming lower coil turns above the lower pole of the lower yoke and forming a back gap of the lower yoke. In addition, the method includes forming an upper pole of the lower yoke above the lower coil turns and forming a lower pole of an upper yoke. Furthermore, the method comprises forming upper coil turns above the lower pole of the upper yoke and forming a back gap and an upper pole of the upper yoke, the upper pole being above the upper coil turns, wherein a length of the upper yoke is defined between a pole tip thereof and a back gap thereof, a length of the lower yoke is defined between the pole tip thereof and the back gap thereof, and the length of the upper yoke is different than the length of the lower yoke.

Other aspects, advantages and embodiments of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 3A is a cross-sectional view of one particular embodiment of a perpendicular magnetic head with helical coils.

FIG. 3B is a cross-sectional view of one particular embodiment of a piggyback magnetic head with helical coils.

FIG. 4A is a cross-sectional view of one particular embodiment of a perpendicular magnetic head with looped coils.

FIG. 4B is a cross-sectional view of one particular embodiment of a piggyback magnetic head with looped coils.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a system is provided. The system comprises an upper yoke having a first length defined between a pole tip thereof and a back gap thereof; a lower yoke having a second length defined between a pole tip thereof and a back gap thereof, the second length being greater than the first length; and coil turns in the upper and lower yokes.

In another general embodiment, a system is provided. The system comprises an upper yoke having a first length defined between a pole tip thereof and a back gap thereof, a lower yoke having a second length defined between a pole tip thereof and a back gap thereof, the second length being less than the first length; and coil turns in the upper and lower yokes.

In another general embodiment, a method is provided. The method comprises forming a lower pole of a lower yoke, the lower pole having a pole tip; forming lower coil turns above the lower pole of the lower yoke; forming a back gap of the lower yoke; forming an upper pole of the lower yoke above the lower coil turns; forming a lower pole of an upper yoke; forming upper coil turns above the lower pole of the upper yoke; and forming a back gap and an upper pole of the upper yoke, the upper pole being above the upper coil turns, wherein a length of the upper yoke is defined between a pole tip thereof and a back gap thereof, wherein a length of the lower yoke is defined between the pole tip thereof and the back gap thereof, wherein the length of the upper yoke is different than the length of the lower yoke.

Figure 1:
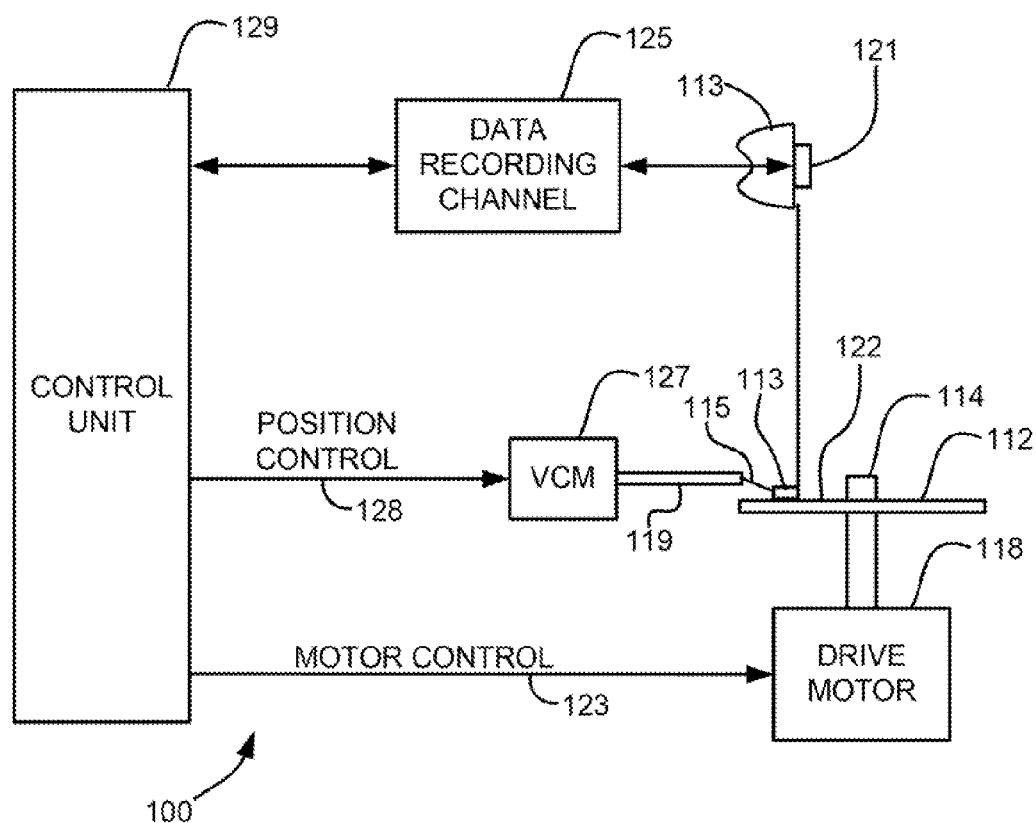
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
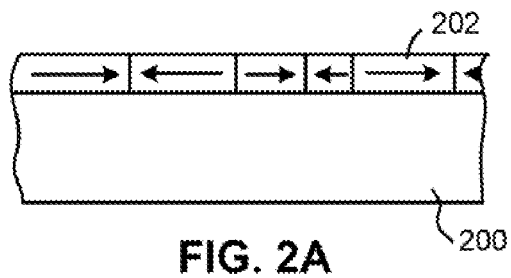
FIG. 2A is a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2C:
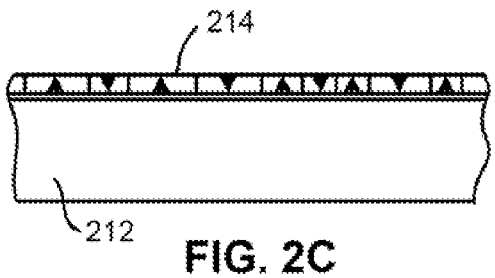
FIG. 2C is a magnetic recording medium utilizing a perpendicular recording format.
Figure 2B:
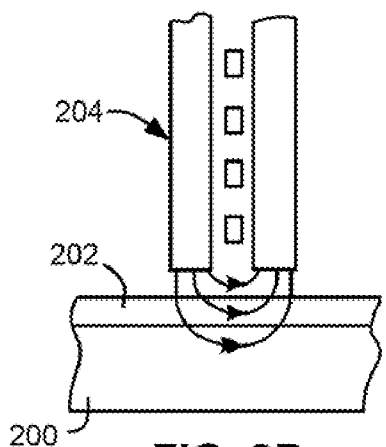
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
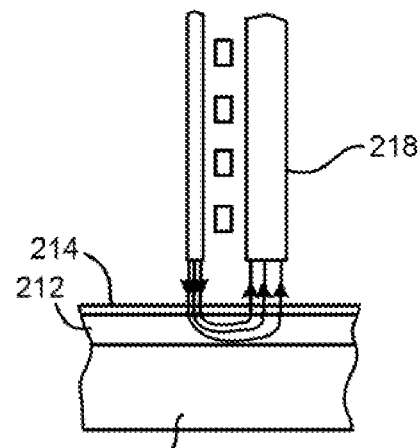
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
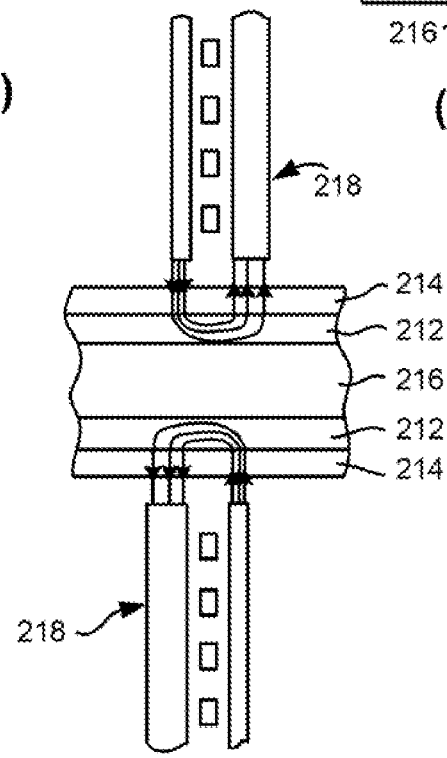
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

FIG. 4B illustrates another type of piggyback magnetic head having similar features to the head of FIG. 4A including a helical coil 410, which wraps around to form helical coil 412. Also, sensor shields 422, 424 are shown. The sensor 426 is typically positioned between the sensor shields 422, 424.

In FIGS. 3B and 4B, an optional heater 328, 428, respectively, is shown near the non-ABS side of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

Figure 5A:
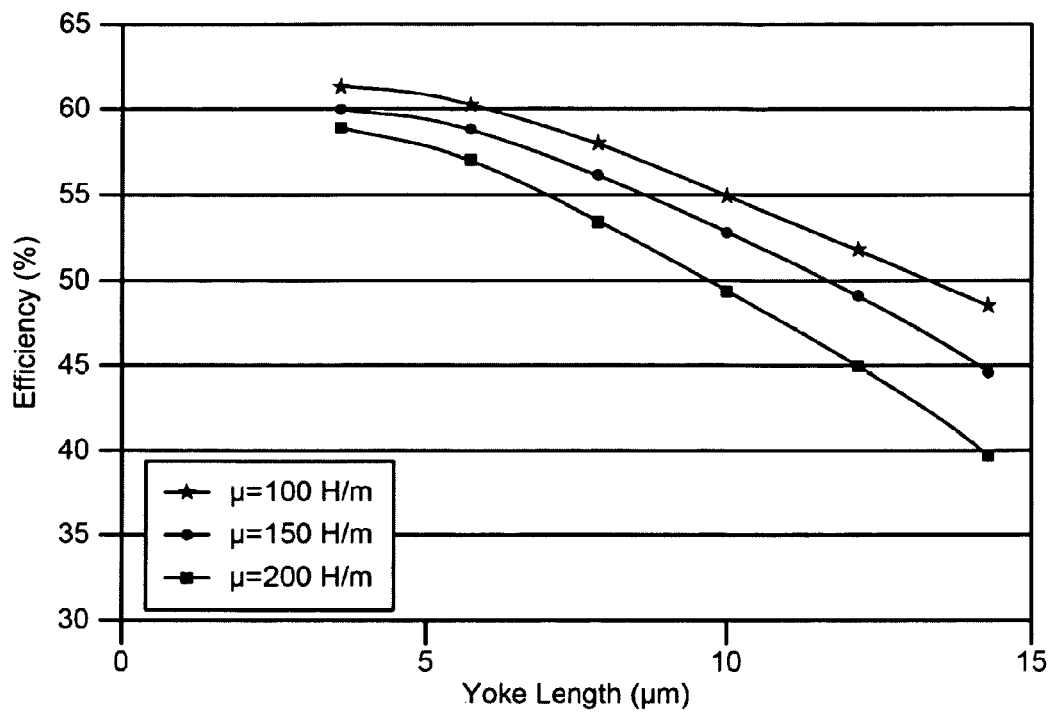
FIG. 5A is a chart showing write head efficiency (%) versus yoke length (μm) as modeled for various write heads.
Figure 5B:
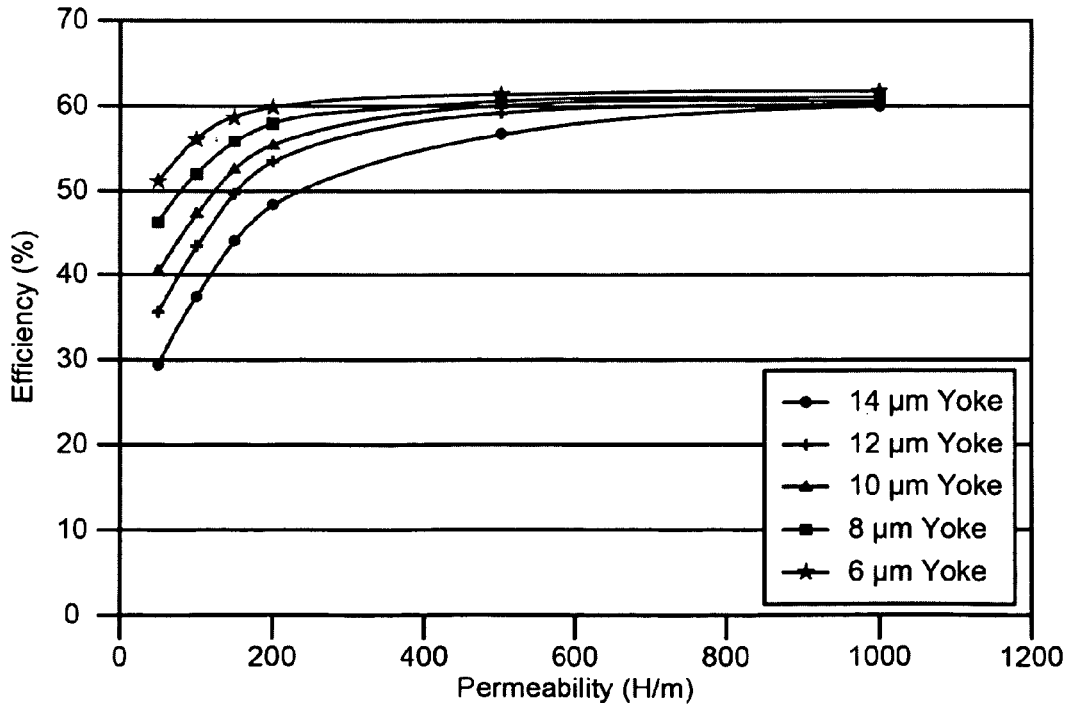
FIG. 5B is a chart showing write head efficiency (%) versus relative magnetic permeability (H/m) as modeled for various yoke lengths.
Figure 5C:
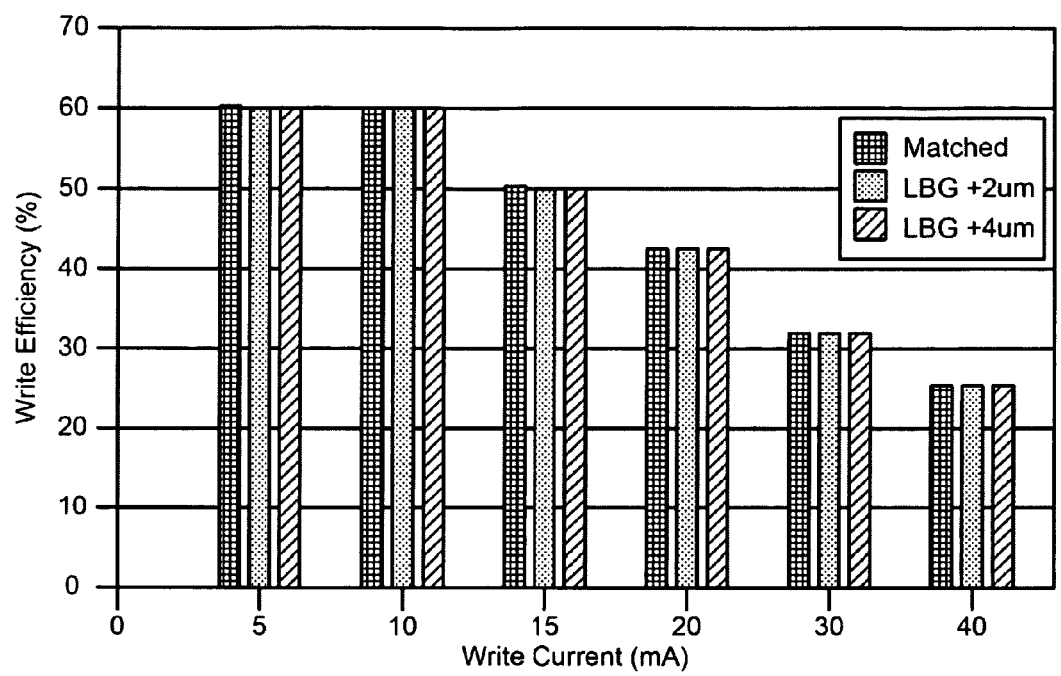
FIG. 5C is a chart showing write head efficiency (%) versus write current (mA) as modeled for write heads having three different lower back gap lengths.

It has been found that decoupling the upper yoke length from the lower yoke length results in advantages to write head operation. Specifically, shorter yoke lengths have better efficiency in operation, as shown in FIGS. 5A and 5B. Also, there is a significant reduction in coil resistance (about 50%) for write heads having different upper and lower yoke lengths, combined with only slightly lower efficiency for longer lower back gap lengths of about −0.1% efficiency, as shown in FIG. 5C. It was unexpected that the reduction in efficiency for longer lower back gap lengths would be so small as to be almost insubstantial.

FIG. 5A shows write head efficiency (%) versus yoke length (μm). There are three data samples reported: the upper line indicates a relative permeability of $\mu=100$ H/m, the middle line indicates a relative permeability of $\mu=-150$H/m, and the lower line indicates a relative permeability of $\mu=200$H/m. As can be seen, the shorter the yoke length, the more efficiently the write head operated, with efficiency values of between about 40% on the lower end of the longest yoke lengths to about 62% on the upper end of the shortest yoke lengths.

Now referring to FIG. 5B, write head efficiency (%) versus relative magnetic permeability (H/m) is shown. Five samples are reported, for yoke lengths of about 6 μm, 8 μm, 10 μm, 12 μm, and 14 μm. As can be seen in FIG. 5B, the shorter yoke lengths produced higher overall write head efficiencies. Also, as the magnetic permeability increases, the write head efficiency increases and approaches a limit at about 60-61%.

In FIG. 5C, write head efficiency (%) versus write current (mA) is shown. Three different samples are reported, with one head having upper and lower back gaps of about equal length. The other two samples have different upper and lower yoke lengths, resulting in a longer lower back gap by about 2 μm and about 4 μm. As can be seen in FIG. 5C, there is very little difference in write head efficiency based on the longer lower back gap. The overall measured difference was only −0.1% for the longer lower back gap head samples. This is much less loss of efficiency than was expected given the dramatic decrease in coil resistance (about 50%).

In regard to write head efficiency with and without a back gap, it has been found that a write head achieves slightly better efficiency with a back gap than without a back gap. In one embodiment, the increase in efficiency is about 0.3%. In addition, there is little difference in write field strength at about 40 mA.

Figure 6:
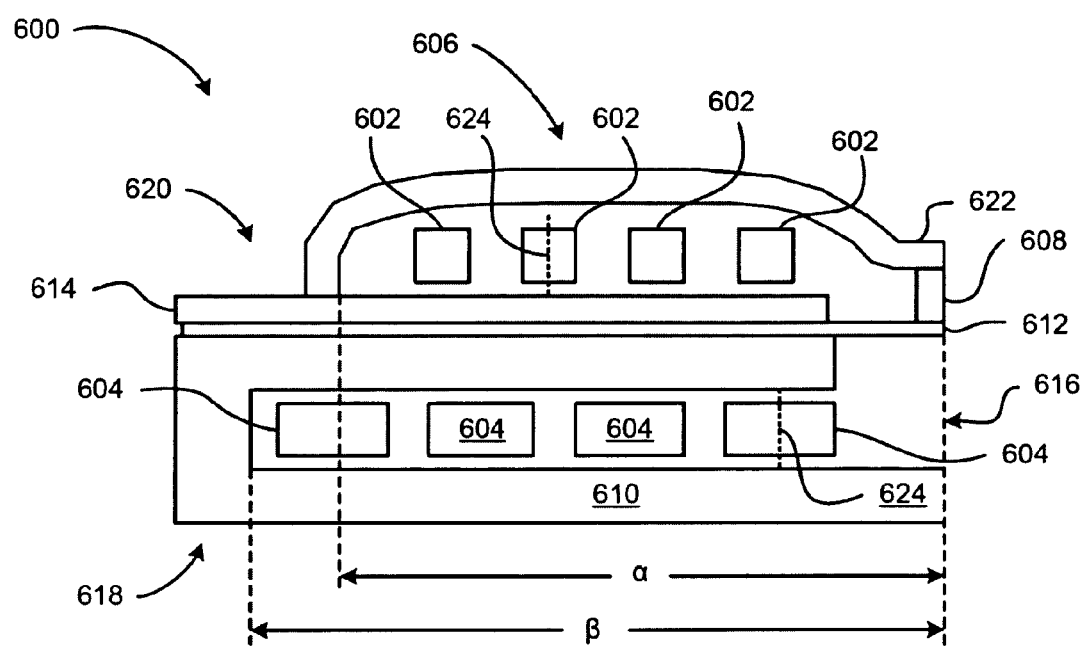
FIG. 6 is a schematic diagram of a write head according to one embodiment.

Now referring to FIG. 6, a portion of a write head 600 having different upper and lower yoke lengths is shown according to some embodiments. The ABS 616 is the side of the write head 600 that is closest to the media to be written. This write head 600 is represented as a piggyback configuration, but any type of write head may be used, including perpendicular magnetic heads, merged magnetic heads, etc.

With continued reference to FIG. 6, in some embodiments, coil turns 602, 604 wrap around the stitch pole 614 and possibly the main pole 612. Note that a coil turn refers to a portion of an overall coil structure. Moreover, the coil turns are not necessarily curved. Rather, they may be generally straight along longitudinal axes thereof. Coil turns 602 extend out of the page from the upper yoke 606; while coil turns 604 proceed down through the paper from the lower yoke 610, possibly wrapping around the poles. The flux that is created by the coil exits the head through the main pole 612 and is directed toward the media (not shown), and then returns through the upper return pole 622. There may be a trailing shield 608 included in the head 600.

In some embodiments, coil turns 602, 604 may be part of a helical coil. In other embodiments, coil turns 602, 604 may be part of a looped coil.

In several embodiments, the upper and lower yokes 606, 610 and coil turns 602, 604 may form part of a perpendicular writer. In other embodiments, the upper and lower yokes 606, 610 and coil turns 602, 604 may form part of a conventional writer.

In some embodiments, the upper yoke 606 may be a different length than is the lower yoke 610. The length of the upper yoke 606 may be defined as the distance between a pole tip of the head 600 and a back gap 618 of the head 600. The length of the lower yoke 610 may be defined as the distance between a pole tip of the head 600 and a back gap 618 of the head 600. In some preferred embodiments, the length of the lower yoke 610 may be greater than the length of the upper yoke 606. However, the length of the upper yoke 606 may be greater than the length of the lower yoke 610, so as to create an extended upper back gap 620. The upper yoke has a length of α, while the lower yoke has a length of β. This difference in lengths results in a longer lower back gap 618.

Due to the difference in upper and lower yoke lengths, coil turns 602 and 604 may have different cross sectional profiles. Moreover, the cross sectional areas of the upper and lower coil turns 602, 604 may be the same or different. In some approaches, thicknesses of the coil turns 602 in the upper yoke 606 may be greater than thicknesses of the coil turns 604 in the lower yoke 610. In other approaches, widths of the coil turns 604 in the lower yoke 610 may be greater than widths of the coil turns 602 in the upper yoke 606. In still more approaches, cross sectional areas of the coil turns 604 in the lower yoke 610 may be greater than the cross sectional areas of the coil turns 602 in the upper yoke 606. This in turn lowers the overall resistance of the coil. Generally, any increased coil cross sectional area corresponds to greater yoke length, but in some embodiments, it does not relate to greater yoke length.

In many embodiments, widths of the coil turns 602 in the upper yoke 606 as measured perpendicular to axes thereof 624 may be less than widths of the coil turns 604 in the lower yoke 610. In other embodiments, widths of the coil turns 604 in the lower yoke 610 as measured perpendicular to axes thereof 624 may be less than widths of the coil turns 602 in the upper yoke 606. In still more embodiments, the widths of coil turns 602 and 604 may be about equal when measured perpendicular to axes thereof 624.

In some embodiments, thicknesses of the coil turns 602 in the upper yoke 606 may be greater than thicknesses of the coil turns 604 in the lower yoke 610, wherein widths of the coil turns 602 in the upper yoke 606 as measured perpendicular to axes 624 thereof may be less than widths of the coil turns 604 in the lower yoke 610. In other approaches, thicknesses of the coil turns 604 in the lower yoke 610 may be greater than thicknesses of the coil turns 602 in the upper yoke 606, wherein widths of the coil turns 604 in the lower yoke 610 as measured perpendicular to axes 624 thereof may be less than widths of the coil turns 602 in the upper yoke 606.

In some embodiments, an electrical resistance for a given length of one of the coil turns 602 in the upper yoke 606 may be greater than an electrical resistance for the same given length of one of the coil turns 604 in the lower yoke 610. In other embodiments, an electrical resistance for a given length of one of the coil turns 604 in the lower yoke 610 may be greater than an electrical resistance for the same given length of one of the coil turns 602 in the upper yoke 606. In another approach, some electrical resistances for given lengths of a coil turn 602 in the upper yoke 606 may be greater and some may be less than some electrical resistances for the same given lengths of a coil turn 604 in the lower yoke 610. However, in some approaches, the coil turns may have substantially consistent electrical resistances for the same coil turn lengths.

In some embodiments, a main pole 612 may be included in the head 600 between the upper yoke 606 and the lower yoke 610. In addition, a stitch pole 614 may be present between the upper yoke 606 and the lower yoke 610, possibly on one or more sides of the main pole 612.

Figure 7:
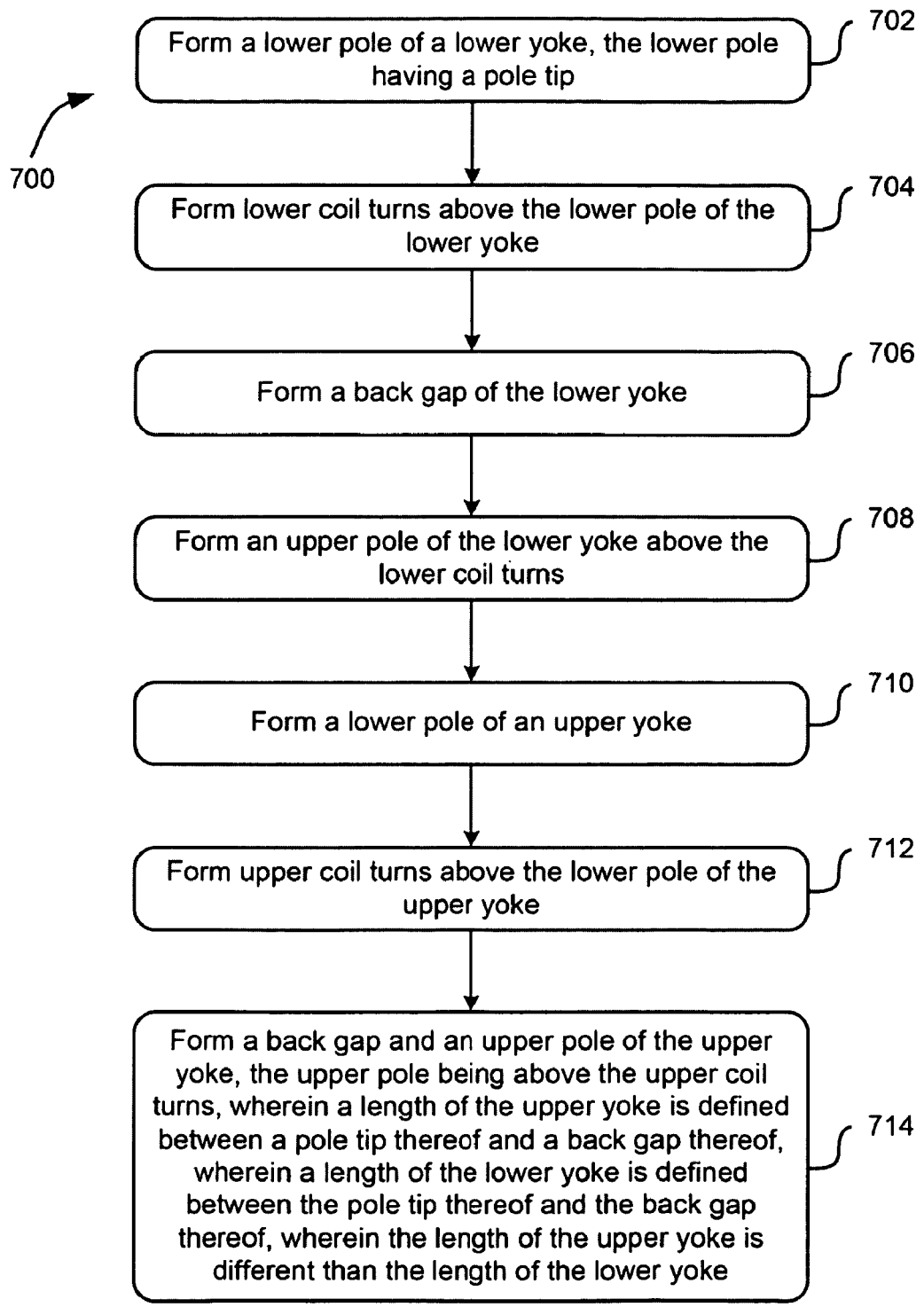
FIG. 7 shows a method according to one embodiment.

FIG. 7 shows a method 700 according to one embodiment. Method 700 may be used in conjunction with the functionality and architecture of any of FIGS. 1-6. Also, method 700 may be used in any environment as desired.

With continued reference to FIG. 7, in operation 702, a lower pole of a lower yoke may be formed, the lower pole possibly having a pole tip.

In operation 704, lower coil turns may be formed above the lower pole of the lower yoke.

In operation 706, a back gap may be formed of the lower yoke.

In operation 708, an upper pole of the lower yoke above the lower coil turns may be formed.

In operation 710, a lower pole of an upper yoke may be formed.

In operation 712, upper coil turns above the lower pole of the upper yoke may be formed.

In operation 714, a back gap and an upper pole of the upper yoke may be formed, the upper pole being above the upper coil turns, wherein a length of the upper yoke may be defined between a pole tip thereof and a back gap thereof, wherein a length of the lower yoke may be defined between the pole tip thereof and the back gap thereof, wherein the length of the upper yoke may be different than the length of the lower yoke.

In some embodiments of method 700, connected coil turns may be formed for connecting the upper and lower coil turns, thereby creating a helical coil.

In some approaches, the length of the upper yoke may be less than the length of the lower yoke. In other approaches, the length of the lower yoke may be less than the length of the upper yoke.

In some further embodiments, thicknesses and/or cross sectional areas of the coil turns in the upper yoke may be greater than thicknesses and/or cross sectional areas of the coil turns in the lower yoke. In other embodiments, thicknesses and/or cross sectional areas of the coil turns in the lower yoke may be greater than thicknesses and/or cross sectional areas of the coil turns in the upper yoke. In some other embodiments, the thicknesses of the coil turns in the upper and lower yokes may be about equal.

In even more further embodiments, widths of the coil turns in the upper yoke as measured perpendicular to axes thereof may be greater than widths of the coil turns in the lower yoke. In other embodiments, widths of the coil turns in the lower yoke as measured perpendicular to axes thereof may be greater than widths of the coil turns in the upper yoke. In some other embodiments, the widths of the coil turns in the upper and lower yokes when measured perpendicular to axes thereof may be about equal.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   an upper yoke comprising an upper pole and a lower pole, said upper yoke having a first length defined between a pole tip thereof and a back gap thereof;
   an lower yoke comprising an upper pole and a lower pole, the lower yoke having a second length defined between a pole tip thereof and a back gap thereof, the second length being greater than the first length; and
   coil turns between the upper and lower poles of each of the upper and lower yokes,
   wherein the back gap of the upper yoke connects the upper and lower poles thereof,
   wherein the back gap of the lower yoke connects the upper and lower poles thereof.

2. A system as recited in claim 1, wherein the coil turns are parts of a helical coil.

3. A system as recited in claim 1, wherein the upper and lower yokes and coil turns form part of a perpendicular writer.

4. A system as recited in claim 1, wherein thicknesses of the coil turns in the upper yoke are greater than thicknesses of the coil turns in the lower yoke.

5. A system as recited in claim 1, wherein widths of the coil turns in the upper yoke as measured perpendicular to axes thereof are less than widths of the coil turns in the lower yoke.

6. A system as recited in claim 1, wherein thicknesses of the coil turns in the upper yoke are greater than thicknesses of the coil turns in the lower yoke, wherein widths of the coil turns in the upper yoke as measured perpendicular to axes thereof are less than widths of the coil turns in the lower yoke.

7. A system as recited in claim 1, wherein an electrical resistance for a given length of one of the coil turns in the upper yoke is greater than an electrical resistance for the same given length of one of the coil turns in the lower yoke.

8. A system as recited in claim 1, further comprising a main pole between the upper and lower yokes.

9. A system as recited in claim 1, wherein the first length is further defined as a distance between a portion of the back gap of the upper yoke that is closest to a media-facing surface and a portion of the upper yoke that is closest to the media-facing surface, and wherein the second length is further defined as a distance between a portion of the back gap of the lower yoke that is closest to the media-facing surface and a portion of the lower yoke that is closest to the media-facing surface.

10. A system, comprising:
    an upper yoke comprising an upper pole and a lower pole, said upper yoke having a first length defined between a pole tip thereof and a back gap thereof;
    an lower yoke comprising an upper pole and a lower pole, the lower yoke having a second length defined between a pole tip thereof and a back gap thereof,
    the second length being less than the first length; and
    coil turns between the upper and lower poles of each of the upper and lower yokes,
    wherein the back gap of the upper yoke connects the upper and lower poles thereof,
    wherein the back gap of the lower yoke connects the upper and lower poles thereof.

11. A system as recited in claim 10, wherein an electrical resistance for a given length of one of the coil turns in the upper yoke is less than an electrical resistance for the same given length of one of the coil turns in the lower yoke.

12. A system as recited in claim 10, further comprising a main pole between the upper and lower yokes.

13. A method, comprising:
    forming a lower pole of a lower yoke, the lower pole having a pole tip;
    forming lower coil turns above the lower pole of the lower yoke;
    forming a back gap of the lower yoke;
    forming an upper pole of the lower yoke above the lower coil turns;
    forming a lower pole of an upper yoke;
    forming upper coil turns above the lower pole of the upper yoke; and
    forming a back gap and an upper pole of the upper yoke, the upper pole being above the upper coil turns,
    wherein a length of the upper yoke is defined between a pole tip thereof and a back gap thereof,
    wherein a length of the lower yoke is defined between the pole tip thereof and the back gap thereof,
    wherein the length of the upper yoke is different than the length of the lower yoke wherein the back gap of the upper yoke connects the upper and lower poles thereof, and wherein the back gap of the lower yoke connects the upper and lower poles thereof.

14. A method as recited in claim 13, further comprising creating connecting coil turns for connecting the upper and lower coil turns.

15. A method as recited in claim 13, wherein the length of the upper yoke is less than the length of the lower yoke.

16. A method as recited in claim 15, wherein thicknesses of the coil turns in the upper yoke are greater than thicknesses of the coil turns in the lower yoke.

17. A method as recited in claim 15, wherein widths of the coil turns in the upper yoke as measured perpendicular to axes thereof are less than widths of the coil turns in the lower yoke.

18. A method as recited in claim 13, wherein the length of the upper yoke is further defined as a distance between a portion of the back gap of the upper yoke that is closest to a media-facing surface and a portion of the upper yoke that is closest to the media-facing surface, and wherein the length of the lower yoke is further defined as a distance between a portion of the back gap of the lower yoke that is closest to the media-facing surface and a portion of the lower yoke that is closest to the media-facing surface.

* * * * *